Figure 1:
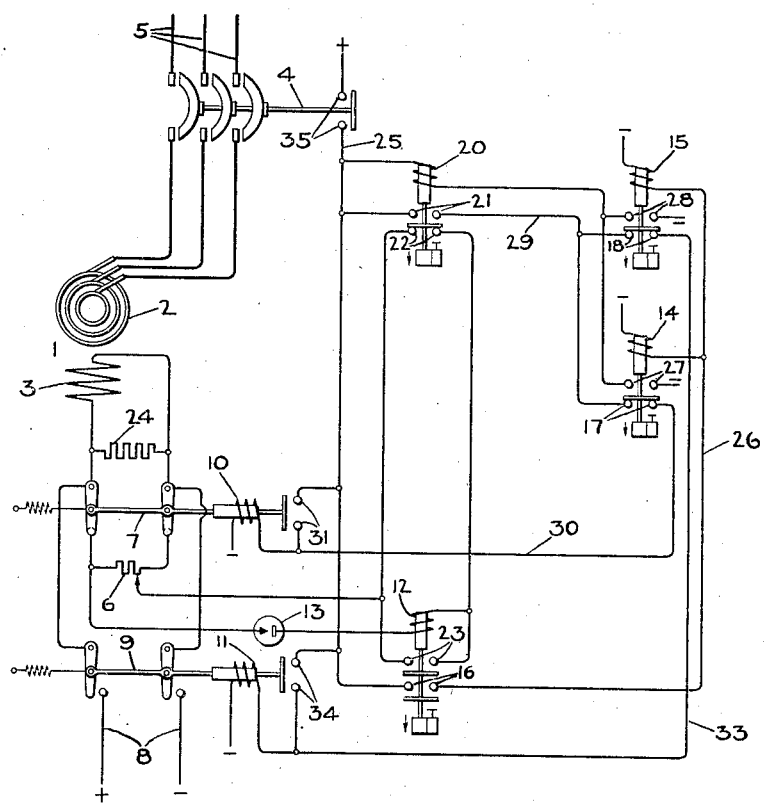

March 21, 1939.    D. R. SHOULTS    2,151,162
METHOD OF AND APPARATUS FOR PULLING SYNCHRONOUS MOTORS INTO STEP
Original Filed Nov. 6, 1935

Inventor:
David R. Shoults,
by Harry E. Dunham
His Attorney.

Patented Mar. 21, 1939

2,151,162

UNITED STATES PATENT OFFICE 2,151,162

METHOD OF AND APPARATUS FOR PULLING SYNCHRONOUS MOTORS INTO STEP

David R. Shoults, Schenectady, N. Y., assignor to General Electric Company, a corporation of New York Application November 6, 1935, Serial No. 48,503
Renewed October 19, 1937

22 Claims. (Cl. 172—289)

My invention relates to a method of and apparatus for pulling a synchronous motor into step, and its object is to provide a new and improved method, and a simple arrangement of apparatus for accomplishing this result.

Synchronous motors are usually started as induction motors with their field windings short circuited through a discharge resistor. When the motor speed reaches a predetermined value near synchronous speed, the circuit through the discharge resistor is opened and at the same instant direct current is supplied to the field winding to pull the motor into step. Various schemes have been suggested heretofore for simultaneously opening the discharge resistor circuit and applying the direct current at a predetermined point on the slip cycle of the induced field current, or at an instant when there exists a predetermined angular position of the field structure relative to the rotating flux in the air gap produced by the alternating current in the armature circuit of the motor. While a material improvement in the ability of some motors to pull into step has been obtained with some of these arrangements, these prior art arrangements do not effect the connection of the source of direct current to the field winding under the most favorable conditions of the synchronizing flux in the field poles to produce the maximum pull-in or synchronizing torque.

From investigations and tests which I have made, I have found that the maximum pull-in torque is obtained if the field winding is connected to the source of excitation at the instant when the load angle is substantially zero and the alternating current flux in the field poles of the motor is at its maximum possible value and is in the same direction as the flux produced therein by the direct current flowing through the associated field winding during synchronous operation. By load angle I mean the electrical angle between the axis of the field structure of the motor and the field structure of a synchronous machine generating a no load voltage equal to and in phase with the terminal voltage applied to the motor.

When a constant polyphase voltage is applied to the polyphase armature winding of a synchronous motor of the stationary armature type, the current in the armature winding produces a plurality of magnetic poles of alternate polarity and of substantially constant strength which rotate in space at synchronous speed. When the motor is operating as an induction motor, the salient field poles of the rotor pass the magnetic poles produced by the armature current at a speed proportional to the slip of the motor. Consequently the flux in the field poles alternates at a frequency equal to the motor slip and induces in the field windings on the salient field poles a voltage of slip frequency, thus causing a current of slip frequency to flow through the discharge resistor circuit.

My investigations and tests show that while the flux in the field pole linking the field winding is always 90 electrical degrees ahead of the slip frequency current in the field discharge circuit, the maximum value of flux obtainable in the field pole and linking the field winding, while the motor is operating as an induction motor, varies inversely with the time constant of the field discharge circuit. Also my investigations and tests show that a decrease in the time constant of the field discharge circuit causes the maximum value of flux linking a field winding to occur at a smaller load angle and that if the time constant is made very short the maximum value of flux occurs substantially at zero load angle. This then is the most favorable point during the slip cycle to connect the source of excitation to the field winding. These investigations and tests clearly show that in order to obtain the maximum flux linkages in the field circuit at the time excitation is to be applied the time constant of the field discharge circuit must be a great deal shorter than the time constant required, to give the best value of induction motor torque near synchronous speed. Therefore, in accordance with my invention, I employ in order to obtain the best induction motor torque as well as the best pull-in torque, a discharge resistor which gives during starting the best value of induction motor torque near synchronous speed. The resistance value of such a discharge resistor is usually from 5 to 20 times the resistance of the field winding, and generally is proportioned so that the reactance and resistance of field discharge circuit are equal at the maximum subsynchronous speed obtainable by induction motor action. Then when the motor has reached a predetermined subsynchronous speed I suddenly decrease, to a relatively small value, the time constant of the field discharge circuit. This sudden change in the time constant is effected at a predetermined point during that portion of the slip cycle in which the flux in the field poles is building up in the positive direction, which is the direction of the flux produced therein by the direct current in the associated field winding during synchronous operation, so that during the short period of time between the instant when the time constant of the field discharge circuit is decreased and the instant when the load angle becomes zero, the field flux increases at such a rapid rate that substantially the maximum possible amount of armature flux exists in the field poles when the load angle is zero. Then at that instant, when the amount of armature flux in the field poles is substantially the maximum possible amount that can be obtained therein by armature reaction, I connect the source of excitation to the field winding and the motor then pulls into step.

Figure 2:
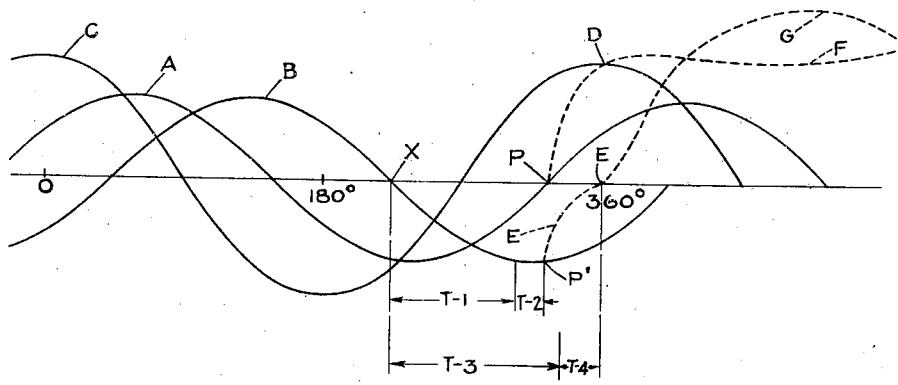

My invention will be better understood from the following description when taken in connection with the accompanying drawing, Fig. 1 of which diagrammatically shows a synchronous motor starting system embodying my invention, and Fig. 2 of which shows explanatory curves, and its scope will be pointed out in the appended claims.

Referring to Fig. 1 of the drawing, I represents a synchronous motor which is provided with an armature 2 and a field winding 3.

In order to simplify the disclosure, I have shown my invention in connection with a full voltage starting arrangement for a synchronous motor so that it is started by connecting the armature winding 2, by means of a suitable manually controlled switch 4, directly across an alternating current supply circuit 5 while the field winding 3 is short-circuited through a discharge resistor 6. Therefore, normal supply circuit voltage is supplied to the motor armature winding to start the motor as an induction motor. In practice the motor also will usually have a squirrel cage winding, which is not shown. While I have shown a full voltage starting equipment, it will be understood that any other well-known synchronous motor starting equipment may be employed to start the motor from rest and accelerate it up to approximately synchronous speed.

The connection of the field winding 3 to the discharge resistor 6 is completed, by means of a field discharge switch 7, when the switch is in the position shown in the drawing. The field winding 3 is also arranged to be connected to a suitable source of excitation 8 by means of a field switch 9 when it is closed. The switch 7 is provided with an operating winding 10, which, when energized, causes the switch to move from the position so as to disconnect the discharge resistor 6 from the field winding 3. The switch 9 is provided with an operating winding 11, which, when energized, closes the switch so as to connect the source of excitation 8 to the field winding 3.

In accordance with my invention, the energizations of the operating windings 10 and 11 are respectively effected at those points in the slip cycle which will produce the most favorable synchronizing operation. In order to accomplish this result, I employ the field application relay arrangement disclosed in United States Letters Patent 1,958,250, granted May 8, 1934, and assigned to the same assignee as this application, and I have this relay initiate the operation of suitable timing means which, after being in operation for a definite length of time, completes an energizing circuit for the operating winding 10 and a predetermined time thereafter completes an energizing circuit for the operating winding 11. This field application relay arrangement preferably consists of a time relay 12 and a half wave rectifier 13 connected in series across a portion or all of the discharge resistor 6. With such an arrangement, the induced current which flows through the motor field winding 3, while the motor 1 is operating below synchronous speed, causes the relay 12 to pick up and remain in its picked up position until the motor reaches a predetermined subsynchronous speed, at which time the frequency of the induced current becomes so low that the half cycle, during which substantially no current flows through the relay winding, is just long enough to allow the relay to return to its normal position at the end of that half cycle of slip frequency current. By having this relay 12 initiate the operation of two suitable timing means which have predetermined definite times of operation and by having one timing means at the end of its definite time of operation, complete an energizing circuit for the operating winding 10 of the switch 7, and the other timing means at the end of another longer definite time of operation complete an energizing circuit for the operating winding 11 of the switch 9, the direct current excitation is always applied under the most favorable synchronizing conditions.

In the arrangement shown, the timing means comprises two definite time relays 14 and 15, which immediately pick up when their respective windings are energized, and each relay does not return to its normally deenergized positions until a predetermined definite time has elapsed after the winding thereof is deenergized. This predetermined definite time may be obtained in any suitable manner and, as shown in the drawing, is obtained by means of an adjustable dashpot connected to the movable element of the relay so that the time delay action of the relays may be adjusted as desired. The circuit of the windings of time relays 14 and 15, which are shown connected in parallel, is arranged to be completed when the contacts 16 of the relay 12 are closed, and to be deenergized when these contacts are open. The relay 14 is provided with contacts 17, which are connected in the circuit of the operating winding 10 of the switch 7 and which are closed a predetermined definite time interval after the relay 12 opens its contacts 16. The relay 15 is similarly provided with contacts 18 which are connected in the circuit of the operating winding 11 of the switch 9 and which are closed a predetermined definite time interval after the relay 12 opens its contacts 16.

In order to insure that the field discharge switch 7 is not opened and the field switch 9 is not closed until after the relays 14 and 15 have been energized in response to the closing of the contacts 16 of relay 12, I provide the relay 20, which has its contacts 21 connected in series with the contacts 17 of relay 14 and the operating winding of switch 7 and also in series with the contacts 18 of relay 15 and the operating winding of switch 9. The circuit of relay 20 is controlled by the relays 14 and 15 so that it cannot be energized to close its contacts 21 until the relay 12 has picked up and effected the energization of either the relay 14 or the relay 15. The relay 20 is designed in any suitable manner so that it immediately closes its contacts 21 when the winding of the relay is energized but when the winding is deenergized it does not open its contacts 21 until after a predetermined time has elapsed.

The relay 20, when in its normally deenergized position, also has its normally closed contacts 22 connected in series with the winding of relay 12 so that this relay 12 can pick up only when relay 20 is in its normally deenergized position. By closing its contacts 23, the relay 12 completes a locking circuit for its winding which is independent of the contacts 22 of relay 20 so that after the relay 12 once picks up it remains picked up independently of the contacts 22 of relay 20.

Permanently connected across the terminals of the field winding 3 is a resistor 24 having a relatively high resistance value. Preferably this resistor 24 is constructed of material having an inverse potential impedance characteristic without time lag, such as is disclosed, for example, in United States Letters Patent 1,622,742 granted September 8, 1931, and assigned to the same assignee as this application. The use of this material as a discharge means for the field current permits the current to be reduced at a higher rate with a safe value of voltage across the field terminals than if a fixed resistor was used.

The operation of the arrangement shown in Fig. 1 of the drawing is as follows: When it is desired to start the motor, the switch 4 is closed so that the full voltage of the circuit 5 is applied to the armature winding 2 to start the motor 1 from rest and accelerate it to approximately synchronous speed. As soon as the motor armature winding 2 is energized, a voltage of slip frequency is induced in the motor field winding 3 and this voltage causes a current of slip frequency to flow through the field winding 3 and the discharge resistor 6 and a pulsating current to flow through the rectifier 13 and the winding of relay 12. Until the motor reaches substantially synchronous speed, the magnitude and periodicity of the rectified current through the winding of relay 12 are such that the relay picks up and maintains its contacts 16 and 23 closed. As soon as the contacts 16 close, a circuit is completed for the operating windings of the relays 14 and 15. This circuit is from one side of a suitable control circuit through auxiliary contacts 35 on the circuit breaker 4, conductor 25, contacts 16 of relay 12, conductor 26, windings of relays 14 and 15 in parallel to the other side of the control circuit. By closing its contacts 27, relay 14 completes through the conductor 25 and the auxiliary contacts 35 on circuit breaker 4 an energizing circuit for the operating winding of relay 20. The contacts 28 of the relay 15 complete a similar circuit for relay 20. By the time the relay 20 opens its contacts 22, the relay 12, by closing its contacts 23, has already completed a shunt circuit around the contacts 22 so that the relay 12 remains energized after the contacts 22 are opened.

Due to low resistance of the discharge resistor 6, the time constant of the field discharge current is relatively long so that when the motor reaches substantially synchronous speed the value of flux in the field at zero load angle is materially below the maximum possible value and also the peak value of flux does not occur until after the load angle has materially increased. This will be more readily seen from the curves shown in Fig. 2, in which curve A shows how the flux linking the field winding varies as the load angle varies at a predetermined constant slip near synchronous speed when the field discharge resistor 6 is connected in the field discharge circuit. The curve B shows how the induced field current varies under the same conditions. These curves clearly show that at points marked 0, and 360°, which are points corresponding to zero load angle, the flux linking the field winding has not yet reached its maximum value and the induced field current has not yet reached zero. The curve C shows how the flux linking the field winding varies when the motor is operating at the same slip with the field winding open circuited so that the time constant thereof is zero. This curve shows the maximum possible amount of flux that can be obtained linking the field winding due to armature reaction, and it will be observed that this maximum amount of flux occurs substantially at zero load angle. By applying excitation now at zero load angle with this maximum available field flux linkage the maximum synchronizing torque will be exerted.

In order that substantially the maximum possible amount of flux indicated at D on curve C may be present in the field pole at the instant the field winding 3 is connected to the source of excitation 8 in the embodiment of my invention shown in Fig. 1, I first open the switch 7 to decrease the time constant of the field discharge circuit, at a predetermined point in the slip cycle so that the flux linking field winding quickly builds up and reaches approximately its maximum possible value D by the time the load angle becomes zero. Then I close the switch 9 to connect the field winding 3 to the source of excitation 8.

I find that this decrease in the time constant of the field circuit should be made shortly before the load angle reaches zero, allowing only sufficient time to reduce the negative field current to zero, with a safe value of voltage across the field terminals by the time zero load angle is reached. The flux linking in the field winding then builds up very rapidly, as shown by the curve P—D because the field discharge circuit now has very little damping effect to any change in flux, and the flux reaches a value substantially equal to its maximum possible value at zero load angle.

When the source of excitation is connected to the field winding, the time constant of the field circuit is thereby greatly increased to such a value that this circuit acts to delay any change in flux already in the field poles and consequently tends to maintain the field flux at its established value while the motor is pulling into step. The curve D—F shows how the flux remains substantially constant while the motor is pulling into step and the curve E—G shows how the field current builds up at the same time.

The arrangement disclosed in Fig. 1 operates automatically to pull the motor into step in accordance with my new and improved method as follows:

When the motor reaches the speed from which it is desired to pull the motor into step, the relay 12 is so adjusted that the frequency of the induced current in the field winding 3 and the resistor 6 is then low enough so that the time interval of each half cycle during which substantially no current flows through the winding of relay 12 which in the arrangement shown is the positive half cycle of the induced current, is just long enough to allow the relay to return to its normal position at a time when the induced field current is approximately zero. In Fig. 2, this is point X on curve B. By opening its contacts 23, the relay 12 interrupts the locking circuit for itself so that it remains deenergized although the value of the next half wave of induced field may be sufficient to pick up the relay, because at this time the contacts 22 in the original energizing circuit of the relay 12 are open. By opening its contacts 16, the relay 12 interrupts the above traced circuits for the operating coils of relays 14 and 15. A predetermined definite time after the contacts 16 open, shown as T—1 in Fig. 2, the relay 14 opens its contacts 27 and closes its contacts 17, thereby effecting the completion of a circuit for the operating winding 10 of the switch 7. This circuit for winding 10 is from one side of the control circuit through auxiliary contacts 35 on switch 4, conductor 25, contacts 21 of relay 20, conductor 29, contacts 17 of relay 14, conductor 30, operating winding 10 of field switch 7 to the other side of the control circuit. By closing its auxiliary contacts 31, the switch 7 completes a locking circuit for its operating winding which is independent of the contacts 21 of the time relay 20, which open after the relay 20 has been deenergized for a predetermined time.

The field discharge switch 7 has a short time of operation, indicated by T—2 in Fig. 2, so that it does not open its main contacts to disconnect the discharge resistor 6 from the field winding until the total time of T—1 plus T—2 has elapsed after the relay 12 operated. The time of operation of the relay 14 is adjusted so that the discharge resistor 6 is disconnected at the desired point P on the field pole flux wave A and at a point P' on the induced field current wave B. The resistor 24, which has a very high value of resistance, is no longer short-circuited so that the time constant of the field circuit is very much shorter than it was. Consequently, the flux linking the field winding increases substantially as shown by the curve P—D and the induced field current decreases along the curve P'—E.

Just before the load angle becomes zero, the relay 15 opens its contacts 28 and closes its contacts 18. This is accomplished by adjusting the relay so that its time of operation when deenergized is equal to the time T—3 in Fig. 2. When the relay 15 closes its contacts 18 it completes an energizing circuit for the operating winding 11 of the field switch 9, this circuit being from one side of the control circuit through auxiliary contacts 35 on circuit breaker 4, conductor 25, contacts 21 of relay 20, conductor 29, contacts 18 of relay 15, conductor 33, operating winding 11 of field switch 9 to the other side of the control circuit. By closing its contacts 34, the field switch 9 completes a locking circuit for its operating winding 11, which is independent of the contacts 21 of relay 20, which are opened a predetermined time after relay 15 opens its contacts 28.

Since the field switch 9 has a short time of operation, indicated by T—4 in Fig. 2, it does not close its main contacts and connect the source of excitation 8 to the field winding 3 until a total time interval of T—3 plus T—4 has elapsed after the relay 12 opened its contacts. The time of operation of the relay 15 is adjusted, however, so that the source 8 is connected substantially at the instant when zero load angle is reached.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. The method of pulling into step a synchronous motor provided with a field winding, which consists in operating the motor with its field winding connected in a closed electric circuit, then decreasing the time constant of said field winding circuit at a predetermined point in the slip cycle, and then supplying direct current to said field winding at a subsequent predetermined point in the slip cycle.

2. The method of pulling into step a synchronous motor provided with a field winding, which consists in operating the motor with its field winding short circuited through a discharge resistor, then increasing the effective resistance in said field winding discharge circuit at a predetermined point in the slip cycle, and then supplying direct current to said field winding at a subsequent predetermined point in the slip cycle.

3. The method of pulling into step a synchronous motor provided with a field winding, which consists in operating the motor with two parallel resistors connected across the terminals of said field winding, one of said resistors having a low value of resistance relative to the resistance value of the other resistor, then opening at a predetermined point in the slip cycle the circuit through the resistor having the lower resistance value, and then supplying direct current to said field winding at a subsequent predetermined point in the slip cycle.

4. The method of pulling into step a sychronous motor provided with a field winding, which consists in operating the motor with its field winding connected in a closed electric circuit, then decreasing the time constant of said field winding circuit at a predetermined time prior to the instant when zero load angle is reached, and then supplying direct current to said field winding substantially at the instant when zero load angle is reached.

5. The method of pulling into step a synchronous motor provided with a field winding, which consists in operating the motor with its field winding connected in a closed electric circuit, then decreasing the time constant of said field winding circuit at a predetermined time prior to the instant when zero load angle is reached and then supplying direct current to said field winding substantially upon the occurrence of the maximum flux obtainable in the field poles with the new time constant.

6. The method of pulling into step a synchronous motor provided with a field winding, which consists in operating the motor with its field winding connected in a closed electric circuit, then decreasing the time constant of said field winding circuit at the instant when a predetermined current flows in the field winding and then supplying direct current to said field winding when a predetermined load angle is reached.

7. The method of pulling into step a synchronous motor provided with a field winding, which consists in operating the field winding short-circuited through a relatively low value of resistance, then at a predetermined point in the slip cycle changing the connections of said field winding so that it is short-circuited through a resistor having a relatively high resistance value and an inverse potential impedance characteristic, and then at a subsequent predetermined point in the slip cycle supplying direct current to said field winding.

8. The method of pulling into step a synchronous motor provided with a field winding, which consists in operating the motor with its field winding connected in a closed electric circuit, then decreasing the time constant of said field winding circuit at a predetermined load angle, and then supplying direct current to said field winding at another predetermined load angle.

9. In combination, a synchronous motor having a field winding, a discharge circuit for said field winding, a source of excitation for said field winding, and means for effecting a decrease in the time constant of said field winding and discharge circuit at a predetermined load angle and then effecting the connection of said source to said field winding at another predetermined load angle.

10. In combination, a synchronous motor having a field winding, a discharge circuit for said field winding, a source of excitation for said field winding, and means for effecting a decrease in the time constant of said field winging and circuit when a predetermined flux condition exists in the field poles and then effecting the connection of said source to said field winding when another predetermined flux condition exists in the field poles.

11. In combination, a synchronous motor having a field winding, a discharge circuit for said field winding, a source of excitation for said field winding, and means for effecting a decrease in the time constant of said field winding and circuit at a predetermined point and then effecting the connection of said source to said field winding substantially at the instant when the maximum flux obtainable in the field poles with the new time constant occurs.

12. In combination, a synchronous motor having a field winding, a discharge circuit for said field winding, a source of excitation for said field winding, and means for effecting a decrease in the time constant of said field winding and discharge circuit when a predetermined flux condition exists in the field poles and then effecting the connection of said source to said field winding at the instant when the maximum flux obtainable in the field poles with the new time constant occurs.

13. In combination, a synchronous motor having a field winding, a discharge circuit for said field winding, a source of excitation for said field winding and means for effecting a decrease in the time constant of said field winding and discharge circuit a predetermined time after a predetermined electrical condition of said motor occurs and then effecting the connection of said source to said field winding a predetermined time after the time constant is decreased.

14. In combination, a synchronous motor having a field winding, a discharge circuit for said field winding, a source of excitation for said field winding, and means for effecting an increase in the resistance of said field winding and discharge circuit a predetermined time after a predetermined electrical condition of said motor occurs and then effecting the connection of said source to said field winding a predetermined time after said resistance is increased.

15. In combination, a synchronous motor having a field winding, a discharge circuit for said field winding, a source of excitation for said field winding, and means for effecting a decrease in the time-constant of said field winding and discharge circuit when a predetermined flux condition exists in the field poles and then effecting the connection of said source to said field winding the first time thereafter that zero load angle is reached.

16. In combination, a synchronous motor having a field winding, a discharge circuit for said field winding, a source of excitation for said field winding, and means for effecting a decrease in the time constant of said field winding and discharge circuit a predetermined time after the termination of a half cycle of slip frequency field current of predetermined duration and polarity and then effecting the connection of said source to said field winding a predetermined time thereafter.

17. In combination, a synchronous motor having a field winding, a discharge circuit for said field winding, a source of excitation for said field winding, and means for effecting an increase in resistance of said discharge circuit a predetermined time after the termination of a cycle of slip frequency field current of predetermined duration and polarity, and then effecting the connection of said source to said field winding a predetermined time thereafter.

18. In combination, a synchronous motor having a field winding, a resistor having a relatively low resistance value connected in series with said field winding, a second resistor having a relatively high resistance value and an inverse potential-impedance characteristic connected in parallel with said first mentioned resistor, a source of excitation, and means for effecting the disconnection of said first mentioned resistor from in series with field winding at a predetermined load angle and then effecting the connection of said source to said field winding at another predetermined load angle.

19. The method of pulling into step a synchronous machine provided with a field winding which consists in operating the machine with its field winding connected in a closed electric circuit, then decreasing the time constant of said field winding circuit at a predetermined point in the slip cycle, and then increasing the time constant of said field winding circuit at a subsequent predetermined point in the slip cycle.

20. The method of pulling into step a synchronous machine provided with a field winding which consists in operating the machine with its field winding connected in a closed electric circuit, then effecting a decrease in the time constant of said field winding circuit when a predetermined flux condition exists in the field poles, and then effecting an increase in the time constant of said field winding circuit when a subsequent predetermined flux condition exists in the field poles.

21. In combination, a synchronous machine having a field winding, a circuit for said field winding, and means for effecting a decrease in the time constant of said circuit for said field winding at a predetermined point in the slip cycle and then increasing the time constant of said circuit at a subsequent predetermined point in the slip cycle.

22. In combination, a synchronous machine having a field winding, a circuit for said field winding, and means for effecting a decrease in the time constant of said circuit when a predetermined flux condition exists in the field poles of the motor and an increase in the time constant of said circuit when a subsequent predetermined flux condition exists in the field poles.

DAVID R. SHOULTS.